United States Patent [19]

Lindner

[11] 4,044,731
[45] Aug. 30, 1977

[54] COMPOSITE PISTON WITH PROTECTION OF THE FASTENING SCREWS AGAINST CORROSION BY A COOLANT

[75] Inventor: Horst Lindner, Konigsbrunn, Germany

[73] Assignee: Maschinenfabrik Augsburg-Nurnberg Aktiengesellschaft (M.A.N.), Augsburg, Germany

[21] Appl. No.: 660,052

[22] Filed: Feb. 23, 1976

[30] Foreign Application Priority Data

Mar. 8, 1975 Germany ............................ 2510192

[51] Int. Cl.² .................... F01M 1/06; F01B 31/08
[52] U.S. Cl. .................... 123/90.35; 92/186; 92/220; 92/255; 123/90.37
[58] Field of Search ............ 92/186, 220, 255; 123/90.34, 90.35, 90.37, 198 E

[56] References Cited

U.S. PATENT DOCUMENTS

| | | | |
|---|---|---|---|
| 1,344,090 | 6/1920 | Schmidt | 123/41.35 |
| 1,547,687 | 7/1925 | Rohwer | 92/186 |
| 2,729,523 | 1/1956 | Von Lassberg | 92/220 |
| 3,323,503 | 6/1967 | Grosshans | 92/220 |
| 3,520,234 | 7/1970 | Hill | 92/220 |
| 3,877,351 | 4/1975 | Barfiss | 92/220 |
| 3,915,141 | 10/1975 | Ottl | 92/255 |
| 3,930,472 | 1/1976 | Athenstaedt | 123/41.37 |

Primary Examiner—Ronald H. Lazarus
Assistant Examiner—Daniel J. O'Connor
Attorney, Agent, or Firm—William R. Woodward

[57] ABSTRACT

A threaded cap screwed into the piston head with a sealed joint to a sleeve tube open and flanged at the other end are provided to encase the clamping screws that fasten the piston head and the upper piston body member and lower piston body member together. The casing thus formed shields the screws from possibly corrosive coolant that under operating conditions could work through the joints between the parts of a composite piston in spite of the clamping pressure of the screws. Each screw is screwed into the threaded cap at the piston head end and its head or a nut bears on the flange of the sleeve tube at the other end. The screws and their protective casings fit within bores in an annular strut forming a large part of the upper piston body member that butts against a low annular ridge on the underside of the piston head into which the end caps of the screw casings are screwed. A seal compressed between the annular ridge of the piston head and the annular strut of the piston body encircles each screw casing and a clearance space extending between this seal and the seal between the threaded cap and the sleeve tube is arranged to drain off any coolant that leaks into the first seal, so that it will not apply pressure to the second seal.

16 Claims, 1 Drawing Figure

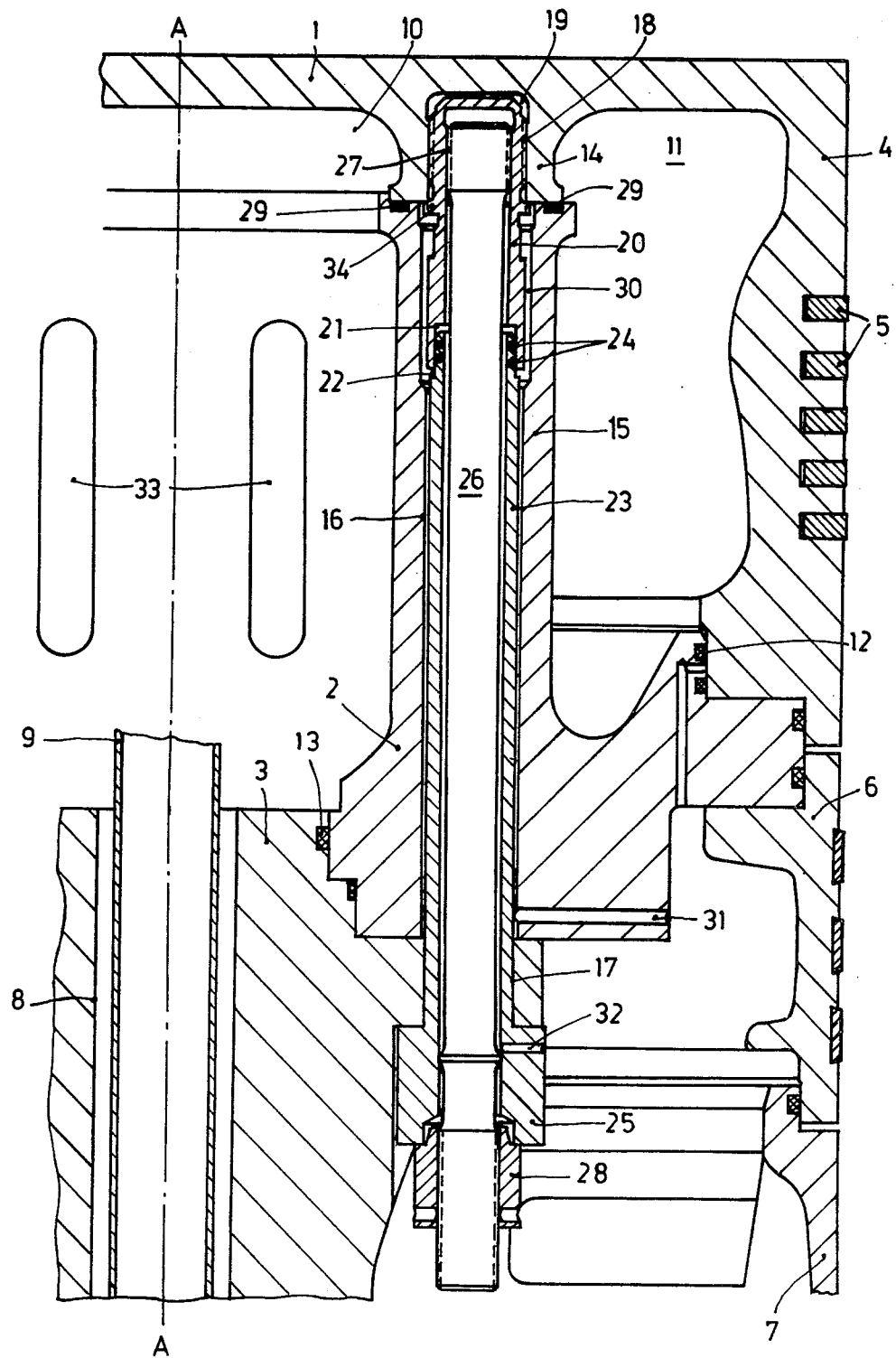

COMPOSITE PISTON WITH PROTECTION OF THE FASTENING SCREWS AGAINST CORROSION BY A COOLANT

This invention relates to a piston for internal combustion engines composed of a piston head and a piston body connected together by screws that are under tension when tightened and providing for space between the piston head and the piston body for filling with a coolant liquid.

A known form of piston of this general class is disclosed in British Pat. No. 718,612. The piston there disclosed can be readily cooled with oil. If cooling water were used, however, in order to provide a greter cooling effect, the clamping screws that hold the two parts of the piston together corrode. This effect brings forth a risk that the piston head will come off the piston body and cause substantial damage to the engine.

It is an object of the invention to provide a piston of composite construction that is suitable for water cooling, capable of withstanding high meachanical and thermal stresses, and having a long service life.

SUMMARY OF THE INVENTION

Briefly, each clamping screw is provided with a casing fastened to the piston head and open at the bottom of the piston body. The casing is in the shape of a sleeve and is liquid tight. The piston head end of the casing has an inner thread for screwing in the clamping screws.

By providing these features, it is possible to prevent access of a corrosive coolant to the clamping screws. The clamping screws can therefore be made of a high-strength material that can withstand great mechanical stresses, even though the material is not among the most resistant to corrosion and leaves something to be desired in the latter respect. The engagement locations of the clamping screws can, furthermore, be placed very near the combustion chamber side of the piston head without raising problems regarding the thermal stability of seals. In accordance with a form of the invention, the protective casing consists of a threaded cap or end shell affixed to the piston head and carrying inner threading for screwing in the clamping screws, and a casing shell or sleeve connected thereto, with a seal being provided between these two parts. This form of the invention makes it possible to make the parts of the casing of different materials each suited to the stresses to which it is subject.

Preferably, the end cap is screwed into the piston head. It is convenient and effective to provide the end shell with an elastic sealing lip that seals off the threads that are provided for screwing the end cap into the piston head. This arrangement provides both a simple construction and a simple assembly of the parts.

The end cap is preferably made of a material with a smaller modulus of elasticity than the material of which the piston head is made. That brings the advantage that the end cap, when under stress, bears the stress not only on the first turns of its threads, but along their entire length, so that the loading capacity of the connection can be substantially increased.

It is to be desired, further, that the end cap should be made of a material with lower heat conductivity than the material of the piston head. That can produce some obstruction to the access of heat to the screw, which in turn reduces the elongation of the screw by heating, through which the clamping tension would be reduced and the firm connection between the piston head and the piston body would be loosened.

It is advantageous to make the end cap out of a titanium alloy. Titanium alloys fulfill both the requirement of a low modulus of elasticity and that of a low heat conductivity.

As another feature that may be incorporated in the invention, one end of the casing sleeve is inserted in the free end of the threaded cap, and the seal between these two parts is located in the region of their overlap. Furthermore, it is advantageous to provide a flange on the casing sleeve on which the head or an equivalent nut of the clamping screw can bear and through it can apply pressure to the adjacent part of the piston body, which body may be composed of an upper and a lower member, with the aforesaid flange bearing against the lower member. These features, on the one hand, facilitate the engagement of the inner threads in the cap and, on the other hand, keep the casing free to a large extent of forces operating in its longitudinal direction, since the pulling forces are transferred merely over the portion of the end cap carrying the two threads, whereas the compression forces that are exerted by the head or nut of the clamping screw is passed on through the flange to the piston body.

Another feature that may be incorporated in the invention is to dispose the casings of the clamping screws so that they pass through a strut forming part of the piston body that, in turn, traverses the coolant space, in which case at the abutment between the strut and the piston head, a second annular seal encircling the casing is provided. In this manner, an additional provision against the access of cooling liquid to the clamping screw is obtained.

Preferably a collection chamber provided with a drain is located between the casing seal and the seal of the strut, so that any coolant liquid penetrating through the first seal cannot build up any pressure against the second seal and is drained off without delay. It is convenient for this collection chamber to surround a length of the casing and has a thin annular shape.

The invention is further described by way of example with reference to the single FIGURE of the drawing which is a longitudinal section of a piston in accordance with the present invention, with the left-hand portion to the left of the axis of the piston broken away because the symmetrical nature of the construction makes it unnecessary to show it.

The piston shown in the drawing comprises a piston head 1 and a piston body that consists of an upper member 2 and a lower member 3 that may be referred to, respectively, as a middle piece and a piston support piece. In the case of cross-head type motors, the lower member of the piston body can form the upper end of the piston rod, as is the case in the particular illustrative embodiment shown. In trunk type piston motors, the lower member of the piston body carries the bearing for the wrist pin of the piston rod. An upper piston skirt portion 4 is formed at the edge of the piston head 1 and carries the piston rings 5. The piston also has a middle piston skirt portion 6 that is connected, in a manner not further shown in the drawing, with the upper member 2 of the piston body, and also a lower piston skirt portion 7 that in a similar well-known manner not further shown in the drawing, is screwed onto the lower member 3 of the piston body.

The lower piston body member 3 has a bore 8 running along the piston axis A—A in which a tube 9 of smaller diameter is set. Cooling water is fed through the tube 9 into the spaces 10 and 11 beneath the piston 1, these places being connected through openings 33. The annular space between the tube 9 and the walls of the bore 8 serve for carrying away this cooling water. The cavities 10 and 11 are sealed off on their lower sides by the upper piston body member 2 and the lower piston body member 3. In order to prevent undesired exit of the cooling water, seals 12 and 13 are provided at the respective abutments between the upper piston skirt portion 4 of the piston head 1 and the upper piston body member 2 and also between the latter and the lower piston body member 3.

On the underside of the piston head 1, which is preferably manufactured as a forging, is an annular extension or ridge 14 which is so short in its height dimension that it can readily be made in a forging. The piston head 1 is supported by this ridge or extension 14 on an annular strut 15 of the upper member 2 of the piston body, which is pierced by openings 33 to allow communication between the interior and the exterior of this annular or tubular strut 15. The strut 15 is thick enough to contain a number of bores 16 running parallel to the longitudinal axis A—A of the piston. The longitudinal axis of each bore 16 is congruent with the axis of a further bore 17 in the lower member 3 of the piston body. Likewise, in the ridge 14 there are round cavities provided with inner threads 18 having respective longitudinal axes likewise congruent with the longitudinal axes of the bores 16. An externally threaded cap 20 is screwed into each inner thread 18 of the respective cavities 19. The end of the cap 20 towards the piston head 1 is closed, whereas the opposite end is opened and has an inner widened portion 21 at its mouth. The threaded cap 20 is made of a titanium alloy, thus a material that in comparison with forged iron, of which the piston head 1 is made, has both a smaller modulus of elasticity and also a lower heat conductivity. It is practical to screw in the cap 20 to an extent such that an air gap remains between it and the piston head 1 in order to block the transfer of heat.

In the widened portion 21 at the mouth of the threaded cap 20, there is inserted the turned-down end 22 of a sleeve tube 23. An elastic band 34 pressed fast against the ridge 14 seals off the threads 18. In the region of the machine turned ends 21 and 22, a seal 24 is provided between the threaded cap 20 and the sleeve tube 23, which seal permits relative axial movement of the tube parts. The lower end of the sleeve tube 23 that passes through the bores 16 and 17 has a flange 25. A clamping screw 26 is passed through the sleeve tube 23 and its upper end is screwed into an inner threading 27 of the threaded shell 20. At the lower end of the clamping screw 26, a nut is screwed on that, acting through the flange 25, can clamp the lower piston body member 3 and the upper piston body member 2 that carries the strut 15 against the ridge 14 of the piston head 1. The threaded cap 20 and the sleeve tube 23 together form a liquid-tight casing for the clamping screw 26 that is effective to ward off or keep out the coolant.

A further seal 29 is provided between the ridge 14 and the strut 15 in a groove of the strut that annularly encircles the threaded cap 20. The seal 29 is spaced far enough from the piston head 1 that it is not exposed to any temperatures that could lead to thermal damage of the seal. Between the casing 20,23 and the seal 29, moreover, an annular collection space 30 is provided within the bore in the strut 15 into which any cooling water that leaks through the seal 29 can penetrate. The lower end of the collection space 30 has a drain 31 out of which any leakage water quantities can drip out without coming into contact with the clamping screw 26. Since the outer diameter of the clamping screw 26 is smaller than the inner diameter of the threaded cap 20 or of the sleeve tube 23, there is a further annular clearance between these parts which connects with a relief bore 32, so as to inhibit the condensation of moisture from air penetrating past the threads of the nut 28, the inhibition being produced by continuous ventilation through the relief bore.

If in a piston so constructed the temperature of the piston head 1 increases during operation, the piston head tends to be bowed so that its upper surface is convex. Such a displacement is opposed in the region of the ridge 14 and the strut 15 by the clamping screws 26, which are tightened down so as to maintain a clamping force. The relatively low heat conductivity of the threaded cap 20 assures that the clamping screws 26 remain relatively cool. These screws, accordingly, are subject to hardly any thermal lengthening, so that their clamping force is largely conserved. The relatively lower modulus of elasticity of the threaded cap 20, compared to that of the piston head, further assures that the threads 18 and 27 are to a considerable extend uniformly loaded over their entire length. As a result of the seal 24 in the region of the overlap of the turned ends 21 and 22, it is assured, in spite of tight clamping of the sleeve tube 23, that thermal elongation of the threaded cap 20 and of the annular strut 15 will not impair the effectiveness of the seal 24. Since no cooling water can reach the seal 24 while still under pressure, in consequence of the provision of the seal 29 and of the collection chamber 30 ahead of it, the access of cooling water to the clamping screw 26 is effectively prevented. Such damage as the seal 29 can suffer as the result of assembly of the piston, accordingly, does not result in a corrosive attack on the clamping screw 26, because the seal 24 can, in any case, prevent access of any leakage water to the clamping screw 26. This form of construction also prevents destruction of the screw fastening and, accordingly, of the piston, if instead of the usual cooling water containing corrosion inhibiting materials, contaminated cooling water or some other cooling fluid with a corrosive effect is used.

Although the invention has been described with reference to a particular illustrative embodiment, it will be understood that variations are possible within the inventive concept.

I claim:

1. In a piston for an internal combustion engine composed of a piston head and a piston body fastened together by clamping screws located within the piston and providing space between the piston head and piston body that are filled with a cooling liquid, the improvement wherein:

each clamping screw is surrounded by a sleeve-shaped liquid-tight casing affixed in the piston head (1) and open only to the underside of the piston body said casing being a member separate from the piston head or body, extending all the way to the vicinity of the the bearing collar serving as screw head at the lower end of the clamping screw and provided at its piston head end with internal threading (27) for screwing in the upper end of the clamping screw, whereby the screws are protected against corrosion in the event of use of an aqueous cooling liquid.

2. Improvement in a piston as defined in claim 1 in which the inner diameter of each said casing (20,23) is greater than the outer diameter of the clamping screw it surrounds so as to provide a clearance space therebetween, and in which an appropriately located relief bore is provided in said casing for said clearance space.

3. Improvement in a piston as defined in claim 1 in which said casing is constituted by an end cap (20) on which said internal threading (27) is provided and a casing sleeve (23) sealed thereto between which a sealing means (24) is interposed.

4. Improvement in a piston as defined in claim 3 in which one end of said casing sleeve (23) is inserted into the free end of said cap (20) and said sealing means (24) is inserted between said end shell and said casing sleeve in the region of their overlap.

5. Improvement in a piston as defined in claim 3 in which said collar of the clamping screw is a nut (28) screwed onto the lower end of said clamping screw, and in which, further, said piston body is composed of upper (2) and lower (3) members, and in which said casing sleeve (23) has a flange (25) through which said nut (28) of the clamping screw (26) presses against said lower piston body member (3) and thereby tightens together both members (2,3) of said piston body and said piston head (1).

6. Improvement in a piston as defined in claim 3 in which said cap (20) is screwed into the piston head (1).

7. Improvement in a piston as defined in claim 6 in which said cap (20) is provided with an elastic sealing lip (35) for sealing of the threads (18) by which the end shell (20) is mounted in the piston head.

8. Improvement in a piston as defined in claim 6 in which said cap (20) is made of a metallic material that has a lower modulus of elasticity than the material of which said piston head (1) is made.

9. Improvement in a piston as defined in claim 6 in which said cap (20) is made of a metallic material that has a lower heat conductivity than the material of which said piston head (1) is made.

10. Improvement in a piston as defined in claim 6 in which said cap (20) is made of an alloy of titanium.

11. Improvement in a piston as defined in claim 3 in which:
said casing (20,23) extends through a strut (15) that passes through the space in which the coolant is located and that is part of said piston body (2,3), and
in which a second sealing means (29) of annular configuration encircling said casing is provided between said strut (15) and said piston head (1).

12. Improvement in a piston as defined in claim 11 in which a collection chamber (30) provided with drainage is located between the sealing means (24) of said casing (20,23) and said second sealing means (29).

13. Improvement in a piston as defined in claim 12 in which said collection chamber (30) annularly surrounds part of the length of said casing (20,23).

14. Improvement in a piston as defined in claim 11 in which said piston body is composed of upper (2) and lower (3) members and said upper piston body member (2) co-operates with said piston head (1) to enclose the coolant space (10,11) and includes said annular strut (15) through which said clamping screws and their casings (20,23) pass and which is radially pierced with openings (33) for passage of coolant.

15. Improvement in a piston as defined in claim 14 in which said strut abuts an annular end surface of an annular ridge (14) of short axial dimension on the underside of said piston head, said ridge (14) being provided with cavities each provided with threading (18) for screwing in the extremities of the respective caps (20) of the casings (20,23) of the respective clamping screws (26).

16. Improvement in a piston as defined in claim 15 in which said piston head is a forging.

* * * * *